July 23, 1940.   M. PFAUTER   2,208,804
GEAR CUTTING OR OTHER MILLING MACHINE
Filed Oct. 19, 1938
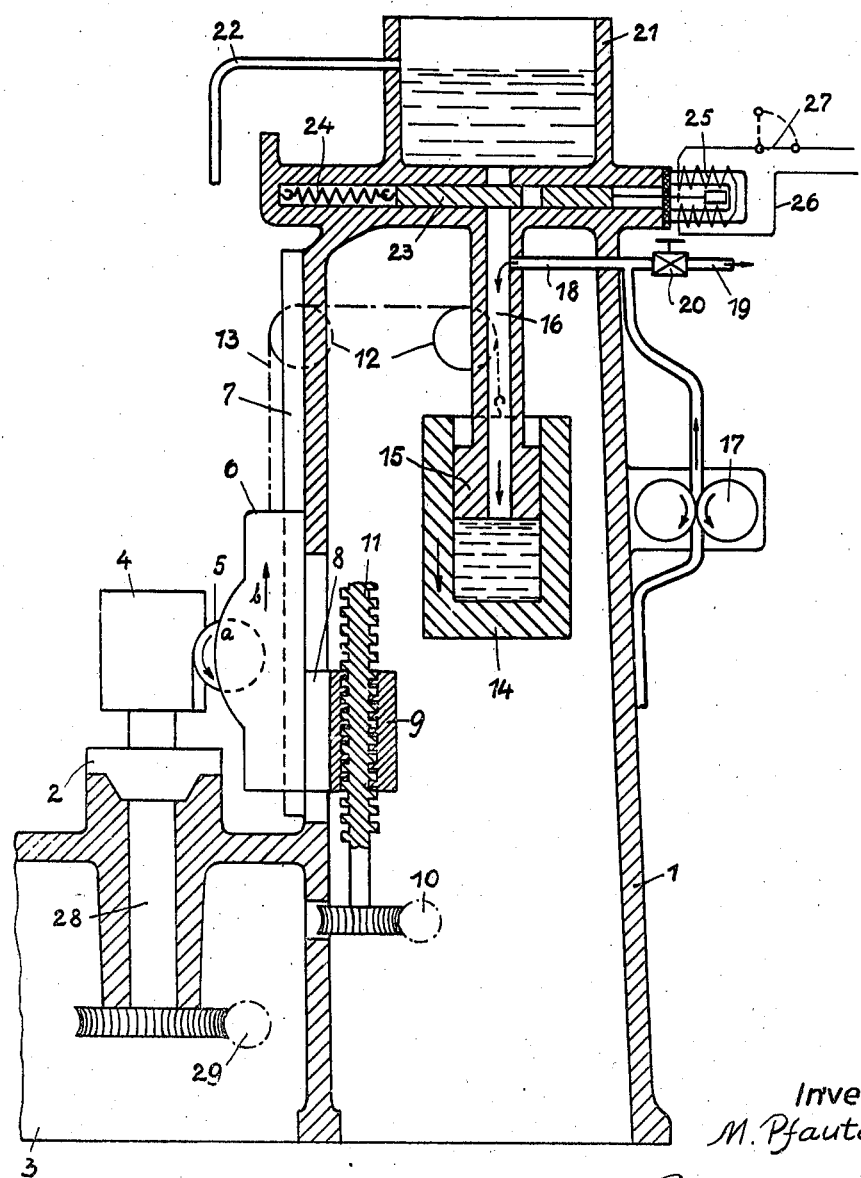
Inventor
M. Pfauter
By
Attorneys Patented July 23, 1940

2,208,804

UNITED STATES PATENT OFFICE 2,208,804

GEAR CUTTING OR OTHER MILLING MACHINE

Michael Pfauter, Chemnitz, Germany

Application October 19, 1938, Serial No. 235,894
In Germany October 28, 1937

7 Claims. (Cl. 90—3)

This invention relates to milling machines of all types, but is especially applicable to machines for milling gear teeth which have a frame having vertical slides on which the milling carriage or saddle moves. In such machines the weight of the carriage or saddle which carries the cutter is usually balanced by a counter-weight which moves vertically in or on the frame.

The object of the invention is to obviate the uncontrollable backward and forward feed movements which occur when the effective part of the cutter is moving in the same direction as that of the feed and which put an uneven load on the machine, endanger the cutter and impair the accuracy of working. These movements are due to backlash in the driving members, which usually comprises a screwed spindle or a rack, and to changes in the forces acting.

When the effective part of the cutter is moving in the direction of feeding, the component of the cutter pressure which acts in the direction of the feed tends to take up any backlash which exists in the feed mechanism. The result is that there is a tendency for the carriage or slide in ordinary circumstances to be fed forward spasmodically, which is dangerous and prejudicial to the machine as a whole and to the cutter. This is obviated according to the invention, by making provision for controlling with certainty the conditions as regards the forces exerted and thus any play or backlash between the carrier of the cutter and the support for the work.

The conditions as regards forces and backlash when the effective part of the cutter is running in the same direction of feeding will be explained below more closely with reference to the accompanying drawing which is a diagrammatic vertical section of the frame and part of the table of one example of the milling machine made in accordance with the invention.

The work 4 which is stationary, or which in the case of hobbing rotates on its own axis, is machined by the cutter 5. The carriage or saddle 6 carrying the cutter is at the same time fed past the work. As the cutter rotates towards the left, as indicated by the arrow, the cutting pressure is exerted upwards. A rack or a screwed spindle 9 feeds the carriage 6 upwards in the direction of the arrow shown on it. As long as the frictional force in the slides is greater than the reaction of the cutting pressure, the upper flank of the driving member (rack or screwed spindle) and the lower flank of the driven or sliding member bear against one another. As soon as the cutting pressure becomes greater than the frictional forces, the upper flank of the driven or sliding member comes against the lower flank of the rack or screwed spindle. This state of affairs manifests itself in practice by the carriage, in so far as the backlash permits of this, performing uncontrollable backward and forward feed movements to an extent permitted by the backlash, which movements put an uneven load on the machine and endanger the cutter.

In the milling machine according to the present invention backlash is taken up by means of a heavy counter-weight. In milling machines, and more especially in gear cutting machines in which the cutter is supported on a carriage moving on vertical slides, the weight of the carriage is normally balanced by a counter-weight. However, when the reaction of the cutter acts in the direction of the feed, this counter-weight would require to be heavy to an inconvenient degree. According to the present invention an additional weight is therefore applied in the form of hydraulic pressure. Owing to the possibility of applying and removing this pressure the advantages described below are obtained. Accordingly, a force which acts in the direction of the feed is applied, in addition to that exerted by the counter-weight and the cutting pressure, only when the reaction of the cutter acts in the direction of the feed. This additional force causes the driving elements to bear against the same flanks during the entire operation in which the cutter reaction is in the same direction as the feed so that a uniform movement is ensured during this operation. This additional force is not required to be effective during rapid return or accelerated movement or when the reaction of the cutter acts in the opposite direction to that of the feed, and at such times the cutter carriage is acted upon solely by the counter-weight. When the effective part of the cutter is running in the same direction as that of the feed, the driving element, which is displaced uniformly, determines only the amount of the feed movement while the movement itself is effected solely under the action of the cutting pressure and of the additional force. This arrangement ensures reliability in the operation of the machine, especially when the cutter runs in the direction of the feed and leads to simplification of the machine. Furthermore, the use of hydraulic force has the advantage of enabling easy regulation and simple control of the magnitude of the forces involved by means of a manometer. According to a further feature of the invention the machine is simplified by making the cylinder by means of which the hydraulic force is exerted form the counter-weight of the cutter carriage.

Referring again to the drawing, 1 is the frame of the machine, 2 is its work table and 3 the bed. The table can be made to be longitudinally displaceable in known manner by means of a carriage or saddle on the bed. The work 4, which is stationary or which in the case of hobbing rotates on its own axis, is machined by the cutter 5 which is carried by the carriage 6, the carriage 6 travelling past the work 4. The carriage 6 slides vertically on guides 7 of the frame 1. An internal thread 9 which is provided in an extension 8 of the carriage 6 engages with a screwed spindle 11 which is rotated from the drive of the machine by way of a worm drive 10. The cutter 5 rotates towards the left, in the direction of the arrow a. The carriage 6 is to move upward (arrow b), the cutting pressure of the cutter acts to the carriage 6 in an upward direction, so that feed and cutting pressure have the same direction.

A chain 13 which runs over chain wheels 12 is attached at one end to the carriage 6 and to the other end to a counter-weight 14 which moves up and down in the frame 1 of the machine. The counter-weight 14 is constructed in the form of a cylinder for the reception of a liquid, which is preferably oil. A piston 15 enters the cylinder and is integral with the frame 1. A pipe 18 which is connected to a pump 17 communicates with a central bore 16 in the piston 15. The pump 17 also acts as the lubrication pump for the machine so that a separate pump is not required for supplying the liquid under pressure for exerting the hydraulic force. A pressure-regulating valve 20 is provided in a pipe 19 which is connected to the pipe 18.

The central piston bore 16 communicates with an equalising container 21 which is provided with an overflow pipe 22. A slide valve 23 is arranged between the container 21 and the junction of the pipe 18 and the piston bore 16. The valve 23 is acted upon by a tension spring 24 at one end and the other by an electromagnet 25, in the circuit 26 of which is a switch 27 which is preferably connected to the main switch of the machine. The table 2 or the work 4 is rotated by a shaft 28 by way of a worm drive 29 from the drive of the machine.

The operation of the machine in the four different sets of conditions is as follows:

1. The cutter moves in the same direction as that of the feed. The switch 27 is closed so that the slide valve 23 moves to the right under the action of the electromagnet 26 and closes the bore 16 of the piston. The pump 17 forces oil into the cylinder 14 which by way of the chain 13 exerts an additional upward pull on the carriage 6. As a result of this additional force the upper faces of the thread in the nut 9 bear against the lower faces of the thread on the spindle 11 during the entire upward feed movement.

2. Rapid return movement or accelerated travel downwards. When the accelerated movement is initiated the circuit 26 becomes de-energised so that the slide valve 23 is moved to the left under the action of the tension spring 24 and opens the bore 16 of the piston. The oil which is supplied by the pump 17 and displaced by the piston 15 rises into the container 21. The surplus runs back through the pipe 22. The carriage 6 which is now under the action of only the counter-weight 14 is drawn down by the spindle 11, the same thread faces as before lying against one another.

3. Rapid return movement or accelerated travel upwards. When the accelerated travel is initiated the circuit 26 is deenergised so that the slide valve 23 is moved to the left and uncovers the passage 16. The oil supplied by the pump 17 passes into the cylinder and further oil passes out of the container 21 into the cylinder. The spindle 11 raises the slide 6 which is only under the action of the counter-weight 14, the lower faces of the thread of the nut resting against the thread of the spindle.

4. Cutter moving in a direction opposite to that of the feed. The switch 27 is opened so that the pump 17 shut off. The oil which is displaced from the cylinder 14 mounts into the container 21. The spindle 11 draws down the carriage 6 which is only under the action of the counter-weight 14, the upper faces of the thread of the nut resting against the thread of the spindle.

It will be seen that the additional force which is exerted hydraulically is required only when the cutter moves in the same direction as that of the feed. Accordingly only a small quantity of oil is necessary and the pump need only be dimensioned to correspond to the speed of the feed so that it may be small. When the weight of the carriage is balanced by a counter-weight equal in weight to it, the force necessary for displacing the carriage in its accelerated travel need only be one corresponding to the friction of the carriage on its slides. When the cutter runs in a direction opposite to that of the feed, the machine works like any ordinary machine not provided with the device for milling with the cutter running in the same direction as that of the feed. There is an increased pressure between the faces of the thread of the nut and its spindle only when the cutter runs in the direction of the feed so that the life of the spindle and the nut and their driving members are preserved owing to the low power required.

The cylinder need not be in the form of a counter-weight, although it is then necessary to employ more oil and a larger pump. The pump must then correspond to the accelerated speed of travel.

What I claim is:

1. A gear-cutting or other milling machine comprising a bed, a work table on the bed for the work-piece, a frame, a carriage sliding on guides of the frame, and a cutter mounted on the carriage, a counter-weight for balancing the same and hydraulic means for exerting a force to augment the action of the counter-weight when the cutter is moving in the same direction as that of the feed.

2. A machine according to claim 1, wherein the said counter-weight comprising a cylinder by means of which the augmenting force is exerted.

3. A machine according to claim 1, wherein the counter-weight is able to balance the weight of the carriage.

4. A machine according to claim 1, wherein said hydraulic means includes a cylinder, an equalising container above the cylinder adapted to receive the entire liquid content of the cylinder by means of which the hydraulic force is exerted.

5. A machine according to claim 1, including a pump for supplying the liquid under pressure for use in exerting the augmenting force is dimensioned as regards its delivery only in accordance with the volume of liquid required when the milling cutter runs in the same direction as that of the feed.

6. A machine according to claim 1, wherein the liquid under pressure for use in exerting the augmenting force is oil which is supplied by a pump provided on the machine for another purpose.

7. A gear-cutting or other milling machine comprising a bed, a work table on the bed for the work-piece, a frame, a carriage sliding on guides of the frame, and a cutter mounted on the carriage, a counter-weight for balancing the same, and hydraulic means for exerting a force to augment the action of the counter-weight when the effective part of the cutter is moving in the same direction as that of the feed, wherein said hydraulic means includes a cylinder, an equalising container above the cylinder adapted to receive the entire liquid content of the cylinder by means of which the hydraulic force is exerted, the equalising container and the cylinder being connected and automatically controlled by means of a valve.

MICHAEL PFAUTER.